United States Patent [19]

Sannholm

[11] Patent Number: 5,480,512
[45] Date of Patent: * Jan. 2, 1996

[54] METHOD OF CONTROLLING SULFIDITY OF A SULFATE PULP MILL

[75] Inventor: Krister Sannholm, Espoo, Finland

[73] Assignee: A. Ahlstrom Corporation, Noormarkku, Finland

[*] Notice: The portion of the term of this patent subsequent to Jan. 11, 2011, has been disclaimed.

[21] Appl. No.: 173,111

[22] Filed: Dec. 27, 1993

Related U.S. Application Data

[63] Continuation-in-part of Ser. No. 614,722, Nov. 16, 1990, Pat. No. 5,277,759.

[51] Int. Cl.⁶ ..................................................... D21C 11/00
[52] U.S. Cl. ..................... 162/16; 162/30.11; 162/30.1; 159/47.3; 159/DIG. 8
[58] Field of Search ........................... 159/47.3, DIG. 8; 162/16, 30.11, 30.1

[56] References Cited

U.S. PATENT DOCUMENTS 2,976,273  10/1958  Ball et al. .................................. 162/29
3,762,989  10/1973  Timpe ..................................... 162/30.11
4,299,652  11/1981  Masuno et al. ........................ 162/30 K
4,329,199   6/1982  Andersson et al. ........................ 162/19
4,953,607   9/1990  Erkki et al. ............................. 162/30.11

OTHER PUBLICATIONS

Ryham, "A new Solution to Third Generation Chemical Recovery", TAPPI Proceedings, 1992 International Chemical Recovery Conference, pp. 581–588.

Primary Examiner—David L. Lacey
Assistant Examiner—Dean T. Nguyen
Attorney, Agent, or Firm—Nixon & Vanderhye

[57] ABSTRACT

To decrease the sulfur emissions of a sulfate pulp mill, and achieve other advantages, black liquor is heated at a temperature higher than the cooking temperature of the sulfate cook (e.g. between 190° C.–350° C.) and the sulfidity of white liquor produced from the black liquor is adjusted by adjusting the temperature and/or retention time of the heat treatment so that a predetermined amount of sulfur compounds are separated from the black liquor. Pressure heat treatment may occur prior to or after evaporation of the black liquor, or between evaporation stages. Preferably, the sulfur containing gas is thereafter divided into different fractions which are separately combusted.

20 Claims, 3 Drawing Sheets

METHOD OF CONTROLLING SULFIDITY OF A SULFATE PULP MILL

CROSS-REFERENCE TO RELATED APPLICATION

This application is a continuation-in-part of application Ser. No. 07/614,722 filed Nov. 16, 1990, now U.S. Pat. No. 5,277,759.

FIELD OF THE INVENTION

The present invention relates to sulfur emissions from a sulfate pulp mill and especially to a method of decreasing the emissions by heating the black liquor to a temperature higher than the cooking temperature, and separating the sulfur containing gases therefrom.

BACKGROUND OF THE INVENTION

Wood is treated in sulfate cooking process by white liquor containing NaOH and $Na_2S$, whereby lignin dissolves and cellulose fibers are released. The mixture of cellulose fibers (pulp) and cooking chemicals is then treated with water, resulting in the generation of black liquor. The black liquor is next concentrated by evaporation in an evaporation plant. The black liquor thereby concentrated is combusted in a kraft recovery boiler, and the chemical melt thereby produced and containing mainly $Na_2S$ and $Na_2CO_3$, is dissolved in water, resulting in the generation of green liquor. The green liquor is next causticized by caustic lime (CaO) to white liquor containing NaOH and $Na_2S$, and lime sludge mainly comprising $CaCO_3$. This white liquor is transferred back to the digester, and the lime sludge is calcinated in a lime sludge reburning kiln to caustic lime which is recycled back into the causticizing stage.

in a sulfate pulp mill sulfur emissions are generated mainly in the kraft recovery boiler, the evaporation plant and the digester house. In order to decrease the environmental impact of the pulp mill the sulfur emissions should be minimized. It has been found that an increase in the dry solids content of black liquor causes a decrease in the sulfur emissions of the kraft recovery boiler. On the other hand, the sulfur content of green liquor increases as a consequence thereof and thus also results in an increase in the sulfidity of the white liquor as well as the sulfur content of tile black liquor. As a result, the overall sulfur emissions of an evaporation plant will increase as a consequence of the continuous increase of sulfur in the black liquor as described above. The instant invention is directed to overcoming this problem by removing the sulfur containing gas prior to or during tile evaporation process, or immediately prior to combustion of the black liquor (after evaporation thereof).

U.S. Pat. No. 4,929,307 shows that the viscosity of tile black liquor can be decreased by heating the liquor to a temperature higher than its cooking temperature. Consequently, it is possible to evaporate tile black liquor to a higher dry solids content, while also decreasing the sulfur emissions of the kraft recovery boiler. Also U.S. Pat. No. 2,711,430 discloses that heating of black liquor causes tile release of organic sulfur compounds.

Surprisingly, it has been discovered that the above mentioned phenomena can be utilized in a completely new manner. It is thus an object of the instant invention to utilize the above-mentioned phenomena to control the sulfidity of a suifate pulp mill.

SUMMARY OF THE INVENTION

The foregoing object and other objects of tile instant invention are achieved by the removal of sulfur from the black liquor in the form of a gas that contains sulfur compounds at a temperature greater than the cooking temperature, and by adjusting the sulfidity of the white liquor by adjusting the temperature of the lie at treatment and/or the retention time of the black liquor during the heat treatment.

When sulfur is removed from the black liquor before it is combusted in the kraft recovery boiler, the sulfur content of the melt decreases and consequently also that of the green liquor and white liquor. Also the total emission level of sulfur from the pulp mill decreases, due to the decrease in sulfidity of the white liquor, which is used in the digester to cook the wood chips and which is thereby converted into black liquor.

In the heat treatment of black liquor, generally about 1–3 weight-% of the dry solids contained therein will be released as a gas containing dimethylsulfide (DMS). By separating the gas from the black liquor before the liquor is supplied to the kraft recovery boiler or like recovery process (e.g. gasification), the volume of dry solids blowing into the boiler decreases, and thus the load on the boiler decreases.

Moreover, we have found that by adjusting the temperature of the heat treatment and/or the retention time of the black liquor in the reaction vessel it is possible to control the amount of sulfur exiting from the black liquor and thus also adjust the sulfur content of the white liquor regenerated therefrom to a desired level.

In accordance with the instant invention, the heat treatment occurs by pressure heating the black liquor at a temperature of approximately 170–350° C., preferably higher than 190° C. The treatment time depends on the temperature and the quality of the black liquor. The retention time is typically about 20 minutes in order to generate a gas that contains a significant amount of sulfur compounds.

The heat treatment can be carried out prior to evaporation of the black liquor: or during evaporation (between stages). The heat treatment can also be carried out immediately prior to the combustion of the black liquor, after all evaporation stages.

DETAILED DESCRIPTION OF THE DRAWINGS

Figure 1:
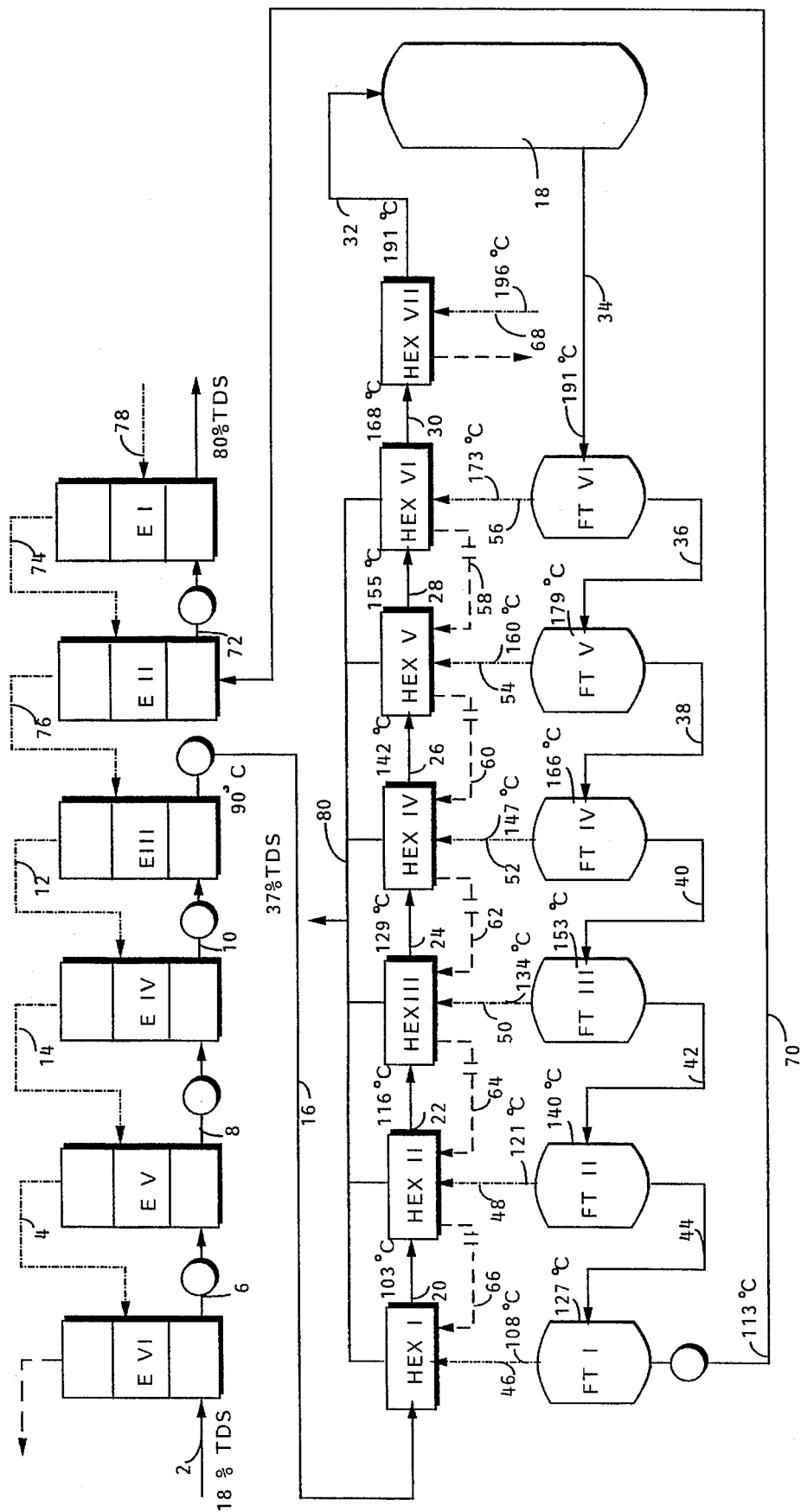
FIG. 1 is a schematic diagram of a multistage flash evaporator and heater system for practicing the method in accordance with the present invention.

In FIG. 1, an exemplary multiple effect evaporator system is shown comprising six evaporation stages or effects E I through E VI. The weak black liquor from the washing section having a dry solids content of about 18% is supplied to effect E VI through line or conduit 2. The six evaporators are of a conventional type, such as falling film evaporators in accordance with U.S. Pat. No. 3,366,158, where the liquor is caused to flow as a continuous film downwards along the heat surfaces and is heated by hot vapor such as steam or vapor from any other source. Preferably the vapor generated by evaporation in effect E V is passed to effect E VI through line 4 and is utilized in effect E VI as the heating vapor. The evaporated liquor from effect E VI is transferred to the next effect E V through line 6, which has a higher temperature and pressure compared with the previous effect. Likewise the liquor is transferred from effect E V to effect E IV through line 8 and from effect E IV to effect III through line 10. The vapors from effect E III are passed to effect E IV through line 12 and from effect E IV to E V through line 14.

As a result of the evaporation, the dry solids content of the black liquor is increased in the example shown in FIG. 1 to a value of 37%. This somewhat concentrated black liquor is then transferred through line 16 for further concentration to a multistage flash evaporator and heater system comprising heat exchangers HEX I through HEX VII, flash tanks FT I through FT VI and reactor vessel 18. The heat exchangers and flash tanks are operatively connected together in the manner such that black liquor flows through the flash tanks counter currently relative to the black liquor flow through the heat exchangers and the vapor generated in the expansion of the liquor is used to indirectly heat the liquor in the heat exchangers. Thus, the heat exchangers are connected in series through lines 20, 22, 24, 26, 28 and 30. The flash tanks are operatively connected in series through lines 36, 38, 40, 42 and 44. The flash tanks are operatively connected to the heat exchangers through lines 46, 48, 50, 52, 54 and 56. The black liquor coming from the evaporation plant is pumped to heat exchanger H EX I through line 16. In HEX I, this liquor is heated by the vapor coming from flash tank FT I through line 46. Similarly, the liquor is heated in heat exchangers HEX II through HEX VI with vapor from flash tanks FT II through FT VI. The liquor is heated with fresh vapor or steam through line 68 in the last heat exchanger HEX VII, whereafter it is transferred for the above described pressure heating to reactor vessel 18 through line 32. From the reactor vessel 18, the liquor is transferred to flash tanks FT VI through line 34. The liquor expands step by step from the pressure of about 13 bar to the pressure of about 2 bar in the flash tanks connected in series and the temperature thereof decreases. The liquor from the last flash tank FT I is pumped through line 70 to effet EII of the evaporation plant and further through line 72 to effect E I. Effect E I is heated by fresh vapor or steam through line 78. The vapor from the evaporation of effet E I is transferred through line 74 to effect EII and the vapor from effect EII is transferred in a corresponding manner through line 76 to effect E III.

The objectives of the pressure heating step described herein, are, on the one hand, to decease the viscosity of the black liquor to be concentrated in the final evaporation stage thereby facilitating and improving the evaporation and further treatment of the liquor, and, on the other hand, to remove the sulfur therefrom. These objectives are achieved by increasing the temperature of the black liquor in the system shown in FIG. 1 by sequentially heating the liquor in the heat exchangers HEX I–HEX VII step by step from about 90° C. to about 191° C., or above, and by maintaining the liquor at about 191° C. or above in the reactor 18 for about 20 minutes. As a consequence of this procedure, lignin molecules in the black liquor are split which results in the aforementioned decrease of viscosity. The decreased viscosity facilitates the final concentration of the liquor at effect E I of the evaporation plant to a dry solids content of about 80%. At the same time, the methoxy groups of the lignin are removed, and DMS is generated. The black liquor can be maintained at 170° C. for five to 60 minutes, or preferably for ten to 30 minutes. Alternatively, the black liquor can be maintained at 190° C. for five to 60 minutes or preferably for ten to 30 minutes, or up to 350° C. (typically for lesser times).

In the FIG. 1 embodiment the heat treatment is carried out immediately prior to the final evaporation stage or effect. However, the heat treatment can be performed wherever it is favorable to do so and/or the removal of sulfur is desired, as will be described further with respect to FIGS. 3 and 4.

When the expansion vapor of the liquor exiting from the flash tanks is condensed in heat exchangers HEX I–HEX VI, a secondary condensate is generated therein. This condensate is transferred through constriction plates from a heat exchanger operating at a higher pressure to a heat exchanger operating at a lower pressure through lines 58, 60, 62, 64 and 66. When the condensate reaches the heat exchanger operating at a lower pressure it expands generated non-condensable gas and also releasing heat to the liquor flowing in the heat exchangers countercurrent to the flow of the secondary condensate. The non-condensable gases containing the sulfur compounds are discharged from the heat exchangers and transferred to a common gas discharge line 80, which is then connected to a sulfur recovery or elimination apparatus such as that shown in FIG. 2.

Figure 2:
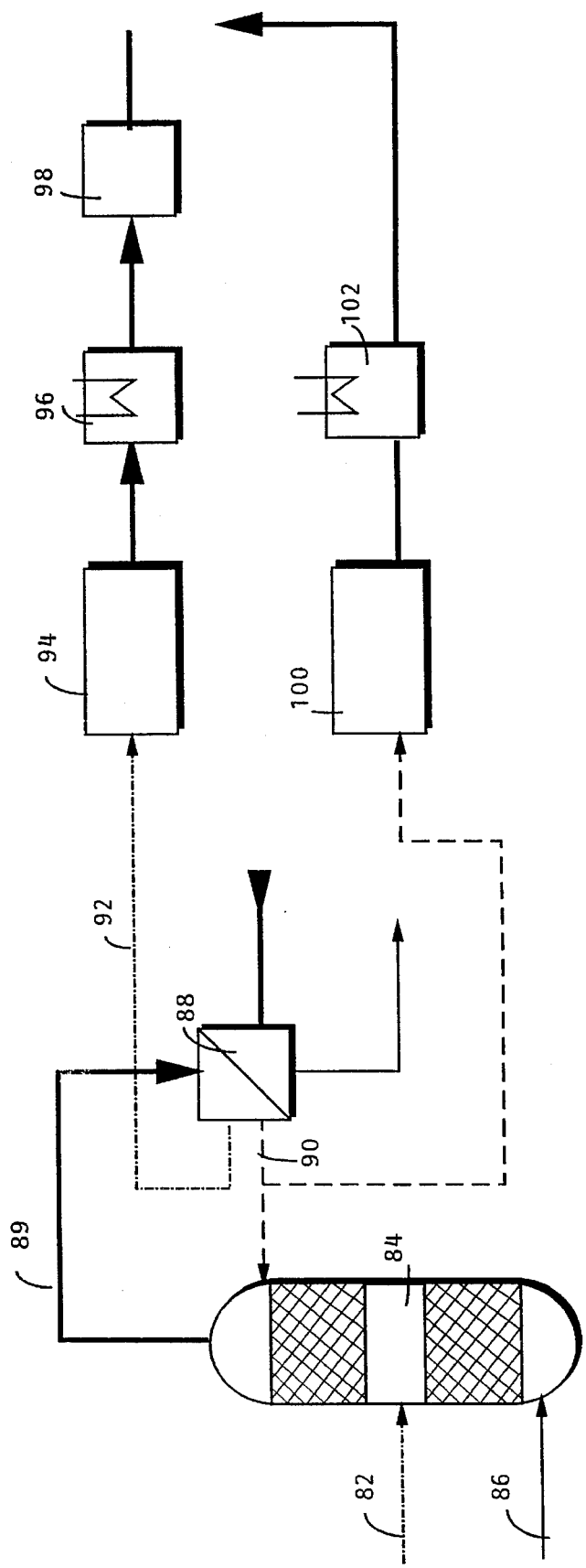
FIG. 2 is a schematic illustration of an apparatus for separating the sulfur compounds containing fractions from the sulfur containing gas flow.

FIG. 2 schematically illustrates an apparatus in which the sulfur compounds containing gas that has been withdrawn from the black liquor in the described pressure-heating process including the flashing and expansion step is divided into two fractions, of which one contains all or substantially all of the sulfur compounds and the other is substantially sulfur-free.

Sulfur containing gases produced in the system shown in FIG. 1 are channelled through conduit 80 and transferred to a conventional two-zone packaged tower 84. In tower 84 these gases pass between the zones. Vapor or steam is supplied through conduit 86 to the bottom part of tower 84.

As shown in FIG. 2, sulfurous gas 89 exiting from tower 84 is cooled in cooler 88, and two fractions, one composed of substantially sulfur-free condensate containing methanol and another comprising gas containing the majority or all of the sulfur compounds, are generated. A portion of the condensate from cooler 88 is supplied by a conduit 90 to the upper part of tower 84. The remaining portion of the condensate is supplied by a conduit 90 to combustor 100, where it is combusted, and heat is recovered in the heat recovery apparatus 102. The fraction comprising the gas which contains most of the sulfur compounds passes out of cooler 88 through conduit 92 into combustor 94, where it is combusted. Heat generated in this combustion is recovered in heat recovery apparatus 96 and the generated $SO_2$ is absorbed in either water, NAOH-solution, or white liquor in absorption apparatus 98, or the $SO_2$ is condensed. The condensed $SO_2$ can be used for many purposes at the pulp mill either as sulfur dioxide or as a raw material, for example, for the production of sulfuric acid.

Sulfurous gases that are generated in other parts of the pulp mill such as the digester, evaporation plant and stripping columns, can be combined with the gas generated in the pressure heating stages shown in FIG. 1, and supplied into packed tower 84, through conduit 80.

The removed sulfur in line 80 is in a small gas stream at high concentration. This stream can be used as a raw material in manufacturing sulfur dioxide, sulfuric acid etc. Having the sulfur in concentrated from allows the equipment needed for those purposes to be smaller than would otherwise be necessary.

It is also apparent that the sulfur compounds in the gas flow in pipe 80 can be recovered or separated by using other known methods, without deviating from the scope of the instant invention.

Figure 3:
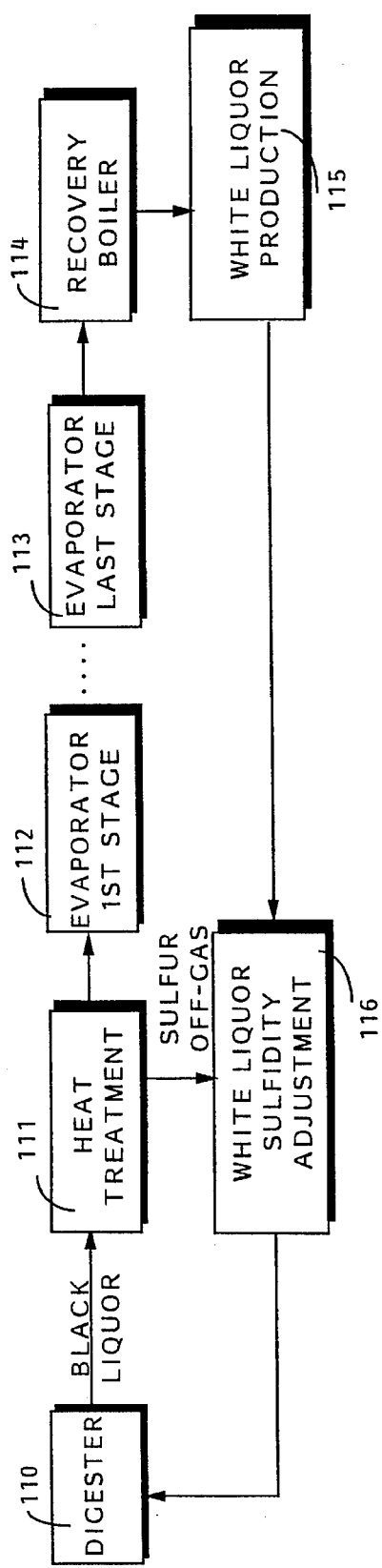
FIGS. 3 and 4 are schematic illustrations of alterative positions of the heat treatment stage in the practice of exemplary methods according to the invention.
Figure 4:
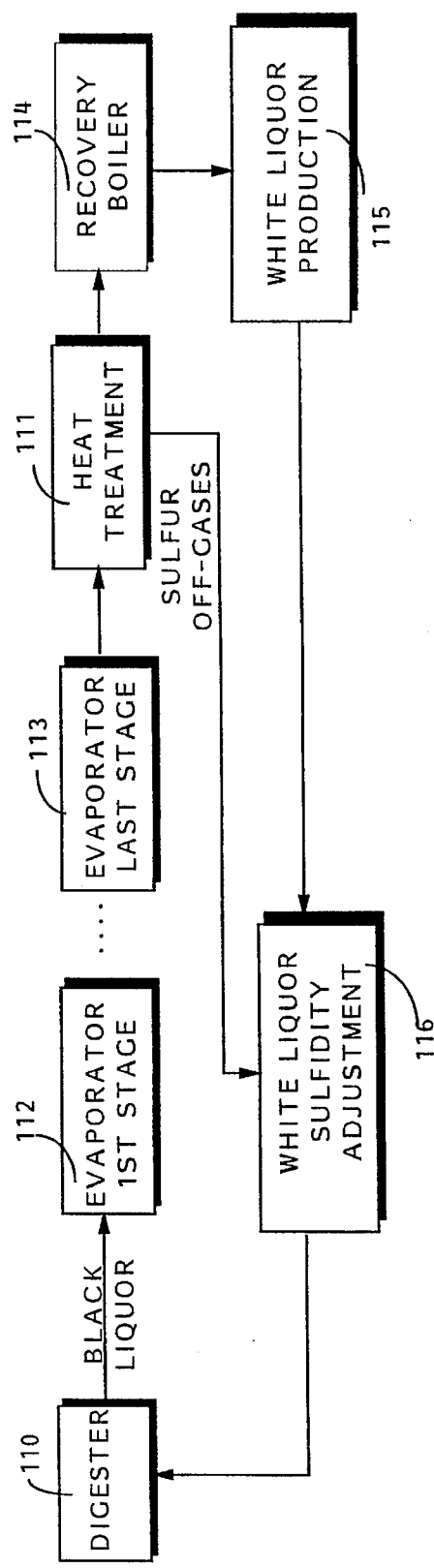

FIGS. 3 and 4 schematically illustrate two alternative embodiments of methods according to the invention. In FIG. 3, rather than the black liquor being heat treated between the first and last evaporation stages, it is heat treated prior to evaporation. That is, black liquor from digester 110 is heat treated as indicated schematically at 111 under pressure (e.g. at a temperature between 190° C. and 350° C.) to produce sulfur off gases (such as DMS), and then is passed to a first evaporation stage 112 of a plurality of stages (as seen in FIG. 1). From the last evaporation stage 113 the black liquor passes to recovery boiler 114, where it is combusted, producing a smelt which is subsequently used (as is conventional) to recover chemicals from the black liquor by making white liquor as indicated at 115. The sulfidity of the white liquor produced at 115 is adjusted by adjusting the temperature and retention time in pressure heat treatment stage 111. Optionally, the white liquor from 115 may be treated with the sulfur off gases from 111 at 116 to further adjust the sulfidity of the white liquor, and then the white liquor is passed to the digester 110 for cooking of wood chips in digester 110. Alternatively, the sulfur off gases from 111 may be split into two tractions and otherwise treated as described with respect to FIG. 2, or absorbed in water or sodium hydroxide solution instead of in white liquor.

In FIG. 4 the equipment is substantially identical to that of FIG. 3, and therefore the components are shown by the same reference numerals in FIGS. 3 and 4. The method is also substantially the same, except that the heat treatment stage/step 111 is provided after the last evaporation stage 113, typically between the last evaporations stage 113 and combustion in the recovery boiler 114.

While there have been shown, described and pointed out the fundamental novel features of the invention as applied to preferred embodiments thereof, it will be understood that various omissions, substitutions and changes in the form and details illustrated and in the operation of the process may be made by those skilled in the art without departing from the spirit of the invention. It is the intention, therefore, to be limited only as indicated by the scope of the claims appended hereto.

What is claimed is:

1. A method of controlling the sulfidity of a sulphate pulp mill, comprising the steps of:
    (a) generating black liquor containing sulfur compounds by treating wood chips in white liquor in a digester including cooking the wood chips at a cooking temperature;
    (b) pressure heating the black liquor to a predetermined temperature higher than the cooking temperature and retaining the heated black liquor at the predetermined temperature for a predetermined retention time, to generate sulphur containing gases;
    (c) removing the sulphur containing gases from the black liquor;
    (d) producing white liquor from the black liquor from step (c);
    (e) adjusting the sulfidity of the white liquor produced in step (d) by controlling the predetermined temperature and retention time from step (b); and
    (f) utilizing said sulfidity-controlled white liquor in the practice of step (*a*).

2. The method as recited in claim 1, comprising the additional step of combusting the sulfur containing gases to form $SO_2$.

3. The method as recited in claim 2, wherein the $SO_2$ is absorbed in water, sodium hydroxide solution, or white liquor.

4. The method as recited in claim 2, wherein the $SO_2$ is condensed.

5. The method as recited in claim 1, comprising the additional step of dividing the sulfur containing gas into a first fraction containing substantially all of the sulfur and a second substantially sulfur-free fraction; and separately combusting each of the fractions.

6. A method as recited in claim 5 wherein step (d) is practiced in part by evaporating the black liquor in a plurality of stages including first and last evaporation stages, and then combusting the black liquor and recovering chemicals used in the manufacture of white liquor from the combusted black liquor; and wherein step (b) is practiced prior to the black liquor passing to the first evaporation stage.

7. A method as recited in claim 5 wherein step (d) is practiced in part by evaporating the black liquor in a plurality of stages including first and last evaporation stages, and then combusting the black liquor and recovering chemicals used in the manufacture of white liquor from the combusted black liquor; and wherein step (b) is practiced after the black liquor passes through the last evaporation stage.

8. The method as recited in claim 1, wherein tile sulfur containing gases are removed in the practice of step (c) in multiple flash evaporators at decreasing pressure.

9. The method as recited in claim 1, wherein the black liquor is treated in step (b) by heating it to a temperature higher than 170° C.

10. The method as recited in claim 9, wherein step (b) is practiced for a time period of between ten and 30 minutes.

11. The method as recited in claim 1, wherein the black liquor is treated in step (b) by heating it to a temperature above 190° C.

12. The method as recited in claims 11, wherein step (b) is practiced for a time period of between ten and 60 minutes.

13. The method as recited in claim 11 wherein step (b) is practiced for a time period of between ten and 30 minutes.

14. A method as recited in claim 1 wherein step (b) is practiced at a temperature between 190° C. and 350° C.

15. A method as recited in claim 14 wherein step (d) is practiced in part by evaporating the black liquor in a plurality of stages including first and last evaporation stages, and then combusting the black liquor and recovering chemicals used in the manufacture of white liquor from the combusted black liquor; and wherein step (b) is practiced between the first and last evaporation stages.

16. A method as recited in claim 14 wherein step (d) is practiced in part by evaporating the black liquor in a plurality of stages including first and last evaporation stages, and then combusting the black liquor and recovering chemicals used in the manufacture of white liquor from the combusted black liquor; and wherein step (b) is practiced prior to the black liquor passing to the first evaporation stage.

17. A method as recited in claim 14 wherein step (d) is practiced in part by evaporating the black liquor in a plurality of stages including first and last evaporation stages, and then combusting the black liquor and recovering chemicals used in the manufacture of white liquor from the combusted black liquor; and wherein step (b) is practiced after the black liquor passes through the last evaporation stage.

18. A method as recited in claim 1 wherein step (d) is practiced in part by evaporating the black liquor in a plurality of stages including first and last evaporation stages, and then combusting the black liquor and recovering chemicals used in the manufacture of white liquor from the combusted black liquor; and wherein step (b) is practiced prior to the black liquor passing to the first evaporation stage.

19. A method as recited in claim 1 wherein step (d) is practiced in part by evaporating the black liquor in a plurality of stages including first and last evaporation stages, and then combusting the black liquor and recovering chemicals used in the manufacture of white liquor from the combusted black liquor; and wherein step (b) is practiced after the black liquor passes through the last evaporation stage.

20. A method as recited in claim 1 wherein step (d) is practiced in part by combusting the black liquor and recovering chemicals used in the manufacture of white liquor from the combusted black liquor.

* * * * *